(12) United States Patent
Demsey

(10) Patent No.: US 9,015,062 B2
(45) Date of Patent: Apr. 21, 2015

(54) SYSTEMS AND METHODS FOR CROSS-BROWSER ADVERTISING ID SYNCHRONIZATION

(71) Applicant: AOL Advertising Inc., New York, NY (US)

(72) Inventor: Seth Mitchell Demsey, Vienna, VA (US)

(73) Assignee: AOL Advertising Inc., New York, NY (US)

( * ) Notice: Subject to any disclaimer, the term of this patent is extended or adjusted under 35 U.S.C. 154(b) by 0 days.

(21) Appl. No.: 13/922,379

(22) Filed: Jun. 20, 2013

(65) Prior Publication Data

US 2014/0379482 A1 Dec. 25, 2014

(51) Int. Cl.
*G06Q 30/00* (2012.01)
*G06Q 30/02* (2012.01)

(52) U.S. Cl.
CPC .................................. *G06Q 30/0269* (2013.01)

(58) Field of Classification Search
USPC ............................................... 705/50–79, 14
See application file for complete search history.

(56) References Cited

U.S. PATENT DOCUMENTS

2007/0101361 A1* 5/2007 Spielman et al. ............... 725/35
2013/0185750 A1* 7/2013 Ayoub ............................ 725/34

FOREIGN PATENT DOCUMENTS

KR 20090113456 A * 11/2009 ............. G06Q 30/02

* cited by examiner

*Primary Examiner* — James A Reagan
(74) *Attorney, Agent, or Firm* — Bookoff McAndrews, PLLC

(57) ABSTRACT

Systems and methods are for identifying online advertisements to display to a user based on historical user data collected across the user's use of a plurality of Internet devices. One method includes receiving, over a network, a request for an advertisement to display at a first device of the user, the request including a unique identifier stored on the user's first device; accessing, in a database, a demographic or browsing history information generated from the user's use of a second device, the demographic or browsing history information being stored in the database in relation to the unique identifier; and identifying, based on the demographic or browsing history information, an advertisement to display at the user's first device. The demographic or browsing history information is synchronized based on the unique identifier being stored on the user's first device and the user's second device.

20 Claims, 5 Drawing Sheets

SYSTEMS AND METHODS FOR CROSS-BROWSER ADVERTISING ID SYNCHRONIZATION

TECHNICAL FIELD

Various embodiments of the present disclosure relate generally to online user ID management and to Internet advertising. More specifically, exemplary embodiments of the present disclosure relate to systems and methods for identifying users as they use various devices to access the Internet (e.g., by browser-linking technologies), and to online advertising based on users' identities for targeted and behavioral advertising.

BACKGROUND

In recent years, people have started spending more and more time browsing content on the Internet, as opposed to traditional sources. As a result, the value of advertising on web pages has risen significantly, and techniques for targeting demographics of interest have become very advanced.

Internet cookies have become a ubiquitous and invaluable tool for performing Internet advertising and other important online functions. Traditional techniques for targeting electronic advertising involve configuring users' Internet browsers such that third party cookies can be set, read from, and written to. When a cookie is set on a browser, one of the identifying elements of the cookie is the domain from which it was served. If an Internet user visits, for example, www.site.com and that site contains code to set a cookie, then that cookie will be set with "site.com" as its domain. Continuing this illustrative example, site.com can also embed code that pulls content, such as ads, from URLs that are not on the site.com domain and those ads can also set cookies. For example, site.com can have code on its page that pulls an ad from, by way of example, www.adnetwork.com. The ad will be served from adnetwork.com and will set cookies on the adnetwork.com domain.

Online advertising may be significantly enhanced by web browsers that, by default or by settings, allow third party cookies, and by people who permit visited sites to set and read third party cookies. Use of third party cookies enables ad networks to access cookies that they set across a wide network of websites, thereby enabling behavioral and contextual advertising to web viewers across many visited websites. Specifically, web browsers that are set to allow third party cookies will allow, for example, adnetwork.com to set its cookie despite the user having visited www.site.com. Furthermore, the same browser setting will also allow adnetwork.com to access any cookies set under their domain regardless of which site the Internet user is visiting.

By way of background, ad networks typically have hundreds or thousands of partners (often referred to as "publishers") that publish online content along with "ad tags" provided by their partner ad network. For example, each of a news website (www.news.com), a blog (www.blog.com), and an informational website (www.info.com), among others, may engage an ad network to efficiently and profitably advertise to those websites' viewers. The ad network provides each of those sites with an ad tag having the ad network's domain, e.g., "adnetwork.com." For any visitors, or more specifically, visitors' browsers that allow third party cookies, the ad network may access cookie data of visitors to its partners' sites (i.e., across its entire network of sites), even though those sites' domains (e.g., www.news.com, etc.) do not match the ad network's domain. Specifically, the ad network's ad tag on each site may access cookie data associated with the domain of the ad tag. As a result, the ad network may learn more about a user's browsing history across its network, and therefore more about the user's likely demographics, interests, purchasing goals, and other useful advertising information.

Each time an Internet advertisement is shown to a website visitor is known as an "impression." When the user is shown the advertisement, the user may select, or "click," on the advertisement, or may take another "action," such as completing an online form to request more information. If the user later purchases the product, the purchase is referred to as a "conversion" of the impression. Advertisers may be interested in impressions (e.g., if they are trying to increase awareness of a brand), clicks (e.g., if they are trying to provide more information about a product), or conversions (e.g., if they are trying to make sales or get new users to sign up for services). Advertisers may pay advertising networks and therefore publishers based on, for example, impressions, clicks, or conversions over the course of an advertising campaign. Typically, an advertiser may have a spending plan that specifies how the advertiser wishes to spend its budget during a campaign.

Even though cookies enable advanced targeting and advertising to users whose browsers enable third party cookies, these technologies are unable to leverage browsing history, behavioral and contextual information, and other intelligence relating to a user when it is divided among multiple devices or browsers. Specifically, most modern users of the Internet often use more than one device to access the Internet over the course of a single day, such as, for example, a PC at home, a laptop at work, and one or more tablets and/or mobile devices throughout the day, whether employer-provided or personal. Because of the standards associated with existing cookies and browsers, the advantageous user IDs, browsing history, demographic data, etc., can only be stored in relation to a cookie stored for a particular browser on a particular device. Because online advertisers are interested in improved targeting to their intended audience, ad networks also have a strong interest in providing targeting to users across their various browsers and devices.

Accordingly, a need exists for systems and methods for online user ID management and to Internet advertising. More specifically, a need exists for systems and methods for identifying users as they use various devices to access the Internet (e.g., by browser-linking technologies), and to online advertising based on users' identities for targeted and behavioral advertising.

SUMMARY OF THE DISCLOSURE

According to certain embodiments, methods are disclosed for identifying online advertisements to display to a user based on historical user data collected across the user's use of a plurality of Internet devices. One method includes receiving, over a network, a request for an advertisement to display at a first device of the user, the request including a unique identifier stored on the user's first device; accessing, in a database, a demographic or browsing history information generated from the user's use of a second device, the demographic or browsing history information being stored in the database in relation to the unique identifier; and identifying, based on the demographic or browsing history information, an advertisement to display at the user's first device; wherein the demographic or browsing history information is synchronized based on the unique identifier being stored on the user's first device and the user's second device.

According to certain embodiments, systems are disclosed for identifying online advertisements to display to a user based on historical user data collected across the user's use of a plurality of Internet devices. One system includes a data storage device storing instructions for identifying online advertisements to display to a user based on historical user data collected across the user's use of a plurality of Internet devices; and a processor configured to execute the instructions to perform a method including: receiving, over a network, a request for an advertisement to display at a first device of the user, the request including a unique identifier stored on the user's first device; accessing, in a database, a demographic or browsing history information generated from the user's use of a second device, the demographic or browsing history information being stored in the database in relation to the unique identifier; and identifying, based on the demographic or browsing history information, an advertisement to display at the user's first device; wherein the demographic or browsing history information is synchronized based on the unique identifier being stored on the user's first device and the user's second device.

According to certain embodiments, a non-tangible computer-readable medium is disclosed storing instructions that, when executed by a processor, cause the processor to perform a method for identifying online advertisements to display to a user based on historical user data collected across the user's use of a plurality of Internet devices, the method including: receiving, over a network, a request for an advertisement to display at a first device of the user, the request including a unique identifier stored on the user's first device; accessing, in a database, a demographic or browsing history information generated from the user's use of a second device, the demographic or browsing history information being stored in the database in relation to the unique identifier; and identifying, based on the demographic or browsing history information, an advertisement to display at the user's first device; wherein the demographic or browsing history information is synchronized based on the unique identifier being stored on the user's first device and the user's second device.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

As described above, prior Internet advertising technologies involved cookies that stored advertising identifiers that are local or specific to a single machine/device or browser. The present disclosure describes systems and methods for linking a user's identity across the user's devices to generate and leverage additional opportunities to reach the user with targeted advertising, and assemble fuller, more accurate behavioral profile of a user through the observation of larger slices of the users online activities. Specifically, in one embodiment, the present disclosure relates to systems and methods for leveraging modern browsers, and their attendant features of data storage, sometimes referred to as "local storage," "browser storage," and/or "sandboxed storage." In particular, the present disclosure relates to systems and methods for leveraging a feature in modern browsers offering the ability to synchronize storage across browsers linked to a single user.

In one embodiment, if a user is using a browser with an automatically synchronized app-private sandboxed storage system, the disclosed methods may include creating a sandbox registered to an advertising system or network (using for example HTML5's local storage system). The method may then include creating a unique identifier for the user within the sandbox, and optionally creating an "instance" identifier for the user that is explicitly meant to be different for each device and is useful to differentiate behavior on a per device, but still linked, basis. This identifier can be based on a unique device identifier provided by many mobile devices or another globally unique (e.g., random) identifier serialized to the device. The method may then include leveraging the user's browser's cross-browser synchronization feature to replicate the data created within the sandbox to all of the user's connected browsers. Accordingly, when the associated advertising system or network reads the identifier upon future requests across any of the user's devices, the same identifier for the user may be transmitted, allowing the advertising system to address the same user across multiple devices. In one embodiment, out-of-band mapping systems may further use additional mapping techniques (e.g., WiFi or IP address matching) to map unique IDs in other spaces (e.g., the domain cookie space) to the local storage persistent identifier, thereby providing utility of the presently disclosed techniques outside the set of browsers that implement synchronized storage.

Figure 1:
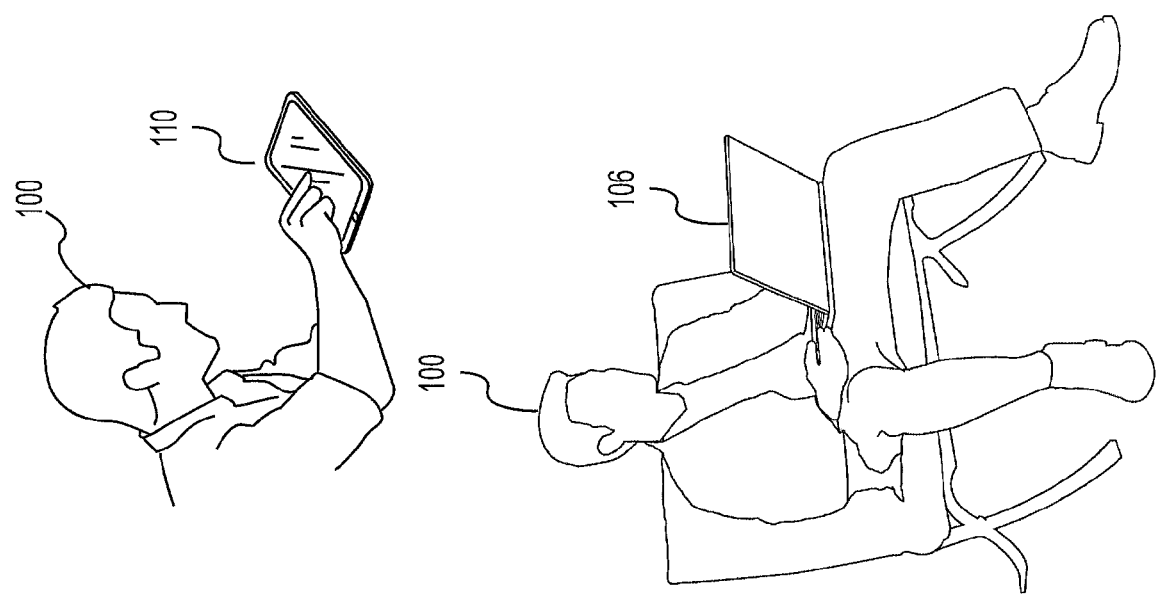
FIG. 1 is a series of schematic diagrams depicting exemplary environments in which users may use disclosed devices and methods according to an exemplary embodiment of the present disclosure.
Figure 1:
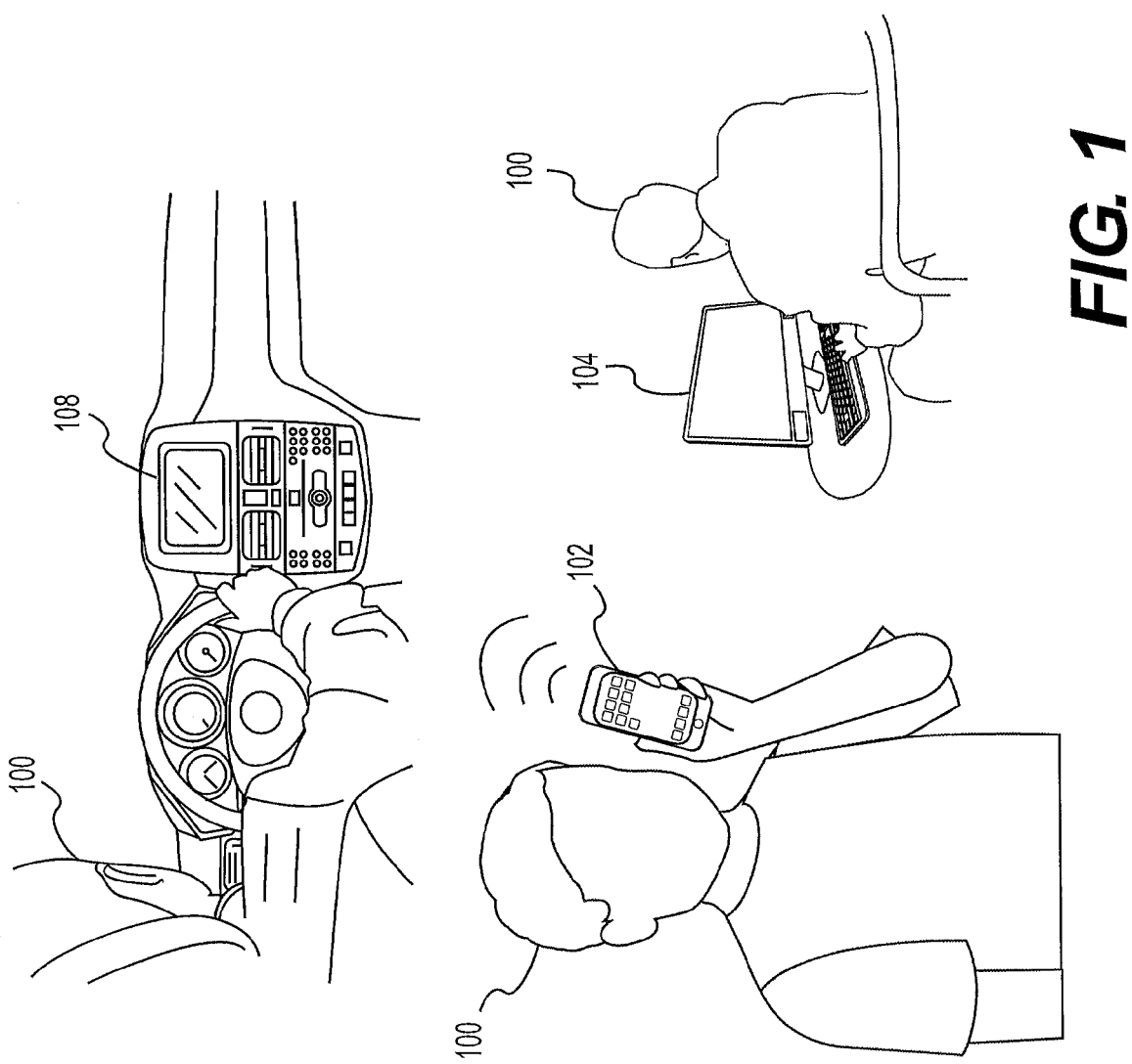

FIG. 1 is a schematic diagram of a series of environments in which users may access Internet content and advertising, according to exemplary embodiments of the present disclosure. Specifically, FIG. 1 depicts how the same user 100 may access the Internet using any number or type of Internet-enabled devices, such as, for example, a mobile device 102 (e.g., smartphone, PDA, etc.), a work computer 104 (e.g., such as a PC, Windows, Mac, etc., whether desktop or laptop), a home computer 106 (e.g., a PC or Mac laptop or desktop), an automobile computer 108 (e.g., whether OEM or after-market), a tablet 110, or any other type of kiosk, computer, or mobile device connected to the Internet through a wired or wireless connection. For example, a typical user might wake up in the morning and check the weather and his or her e-mail on his or her smartphone 102. The user may then drive to work and access Internet content, such as traffic or news, through his or her automobile computer 108. The user may then operate a computer 104 upon arriving at his or her workplace, including to access Internet content, whether related to work activities and/or personal activities. The user may then return home in the evening and use one or more of a home computer 106 and a tablet 110. Of course, the preceding scenario is only exemplary in nature, and users' Internet habits may vary widely in terms of which devices they use at given locations and times. For example, many users may use a tablet 110 only at work or only at home, while other users may use a tablet 110 while at home and at work, and for both personal and professional activities. Likewise, some users may use a mobile device 102 to access both personal and professional Internet content and e-mail throughout the day, even while also using a work computer 104. Also, a user may use a home computer 106 at non-traditional times of the day, and may use the home computer 106 to perform professional activities, whether during the day or evening.

Figure 2:
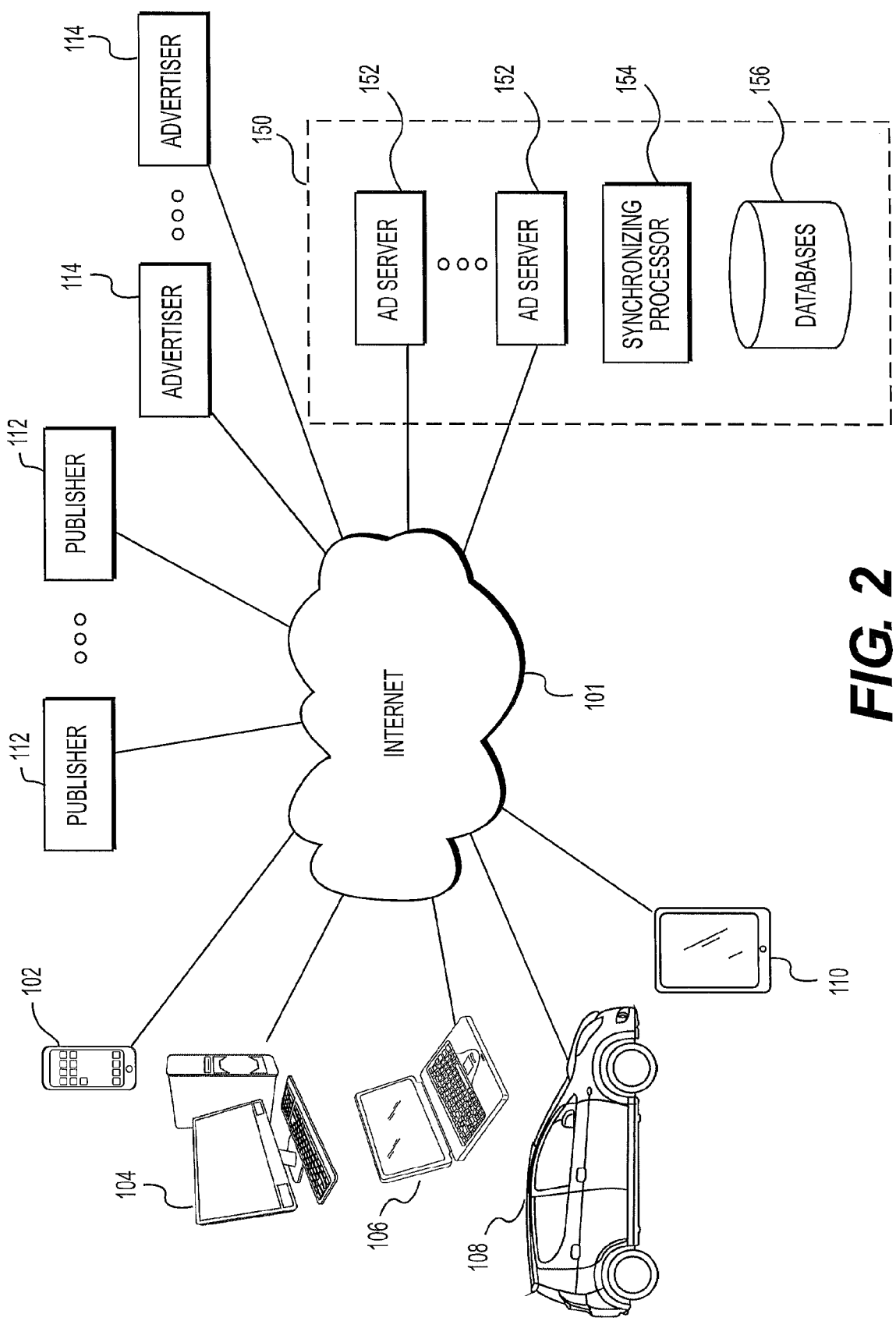
FIG. 2 is a schematic diagram of an exemplary environment and system for synchronizing user advertising IDs across devices and browsers, according to an exemplary embodiment of the present disclosure.

FIG. 2 illustrates an exemplary environment in which users may access the Internet using multiple devices, including a plurality of user devices 102-110. FIG. 2 also illustrates an exemplary system for synchronizing user advertising IDs across devices and browsers, the system including one or more of: publisher servers 112, advertiser servers 114, and synchronization server systems 150, all disposed in communication with the Internet 101. In one embodiment, publisher servers 112 and advertiser servers 114 may be owned and operated by publishing and advertising entities, respectively, and not strictly part of the same system as synchronization server systems 150.

In one embodiment, user devices 102-110 may be owned and used by one or more people, who may be viewers of web pages over the Internet, either through a mobile browser or web browser stored on respective user devices. As described above, user devices 102-110 may include any type of electronic device configured to send and receive data, such as websites and electronic advertisements, over the Internet. For example, each of user devices 102-110 may include a server, personal computer, tablet computer, mobile device, smartphone, and/or personal digital assistant ("PDA") disposed in communication with the Internet. Each of user devices 102-110 may have a web browser or mobile browser installed for receiving and displaying web and/or ad content from web servers. Thus, each of user devices 102-110 may be configured to receive and display data that is received from one or more of publisher servers 112, advertiser servers 114, and synchronization server systems 150, among any other web servers, domain name system ("DNS") servers, content distribution network ("CDN") servers, etc., over the Internet. As described above, in one embodiment, a user may own and, simultaneously or intermittently, use one or more of user devices 102-110, whether of similar or different type.

Publisher web servers 112 may be owned and/or operated by any entities having inventories of available online advertising space. For example, publishers may include online content providers, search engines, e-mail programs, or any other online site or program having online user traffic. Publishers may interact with user devices 102-110, advertiser servers 114, and synchronization server systems 150, through publisher servers 112 connected to the Internet. Thus, publishers may be able to communicate inventory information, such as site information, demographic information, cost information, etc., to other entities in the environment of FIG. 2.

Advertiser servers 114 may be owned and/or operated by any entities having content, such as online advertisements (e.g., display ads, banner ads, pop-ups, etc.) desired to be delivered to online users. Advertisers may interact with user devices 102-110, publisher servers 112, and/or synchronization server systems 150, through advertiser servers 114 connected to the Internet 101. Thus, advertisers may be able to communicate advertising information, such as ad information, targeting information, consumer information, budget information, bidding information, etc., to other entities in the environment of FIG. 2.

Synchronization server systems 150 may be configured to interact with one or more of user devices 102-110, publisher servers 112, and advertiser servers 114 over the Internet 101 to perform any of the presently disclosed techniques and methods. In one embodiment, synchronization server systems 150 may include one or more of: a plurality of ad servers 152, synchronization processor(s) 154, and database(s) 156. Of course, it should be appreciated that ad servers 152 may be operated by an operator only contractually or even loosely affiliated with an operator of synchronization processor 154. Alternatively, the ad servers 152 and synchronization processor 154 may be operated by the same advertising entity or online entity.

Ad servers 152 may include any type of servers configured to process advertising information from advertisers and/or site information from publishers, and send and receive ad requests and information from user devices 102-110, either directly or indirectly. In one embodiment, ad servers 152 may be owned and operated by an ad network, which may be a business that receives ad buys from advertisers, and serves ads on inventory supplied by publishers. Thus, an ad network operating ad servers 152 may receive revenue from advertisers, purchase impressions from publishers, and serve ads on publishers' web pages when viewers associated with user devices 102-110 view those web pages. According to aspects of the present disclosure, ad servers 152 may be configured to interact with synchronizing processor 154, such as through one or more APIs associated with synchronizing processor 154, to obtain one or more of: unique user IDs, cookie data, browsing history, demographic data, user profile data, etc., in response to interaction from user devices 102-110.

In certain embodiments, ad servers 152 may be remote web servers that receive advertising information from advertisers and serve ads to be placed by publishers. Ad servers 152 may be configured to serve ads across various domains of publishers, for example, based on advertising information provided by advertisers. Ad servers 152 may also be configured to serve ads based on contextual targeting of web sites, search results, and/or user profile information. In some embodiments, ad servers 152 may be configured to serve ads based on ad tags served by advertiser servers 114 and/or publisher servers 112, and on ad requests received from user devices 102-110. Ad servers 152 may be configured to send and receive data from user devices 102-110, publisher servers 112, advertiser servers 114, and/or synchronizing processor 154, over the Internet.

Ad servers 152 and synchronizing processor 154, either alone or in combination, may include any type or combination of computing systems, such as clustered computing machines and/or servers. In one embodiment, each of ad servers 152 and synchronizing processor 154 may be an assembly of hardware, including a memory, a central processing unit ("CPU"), and/or a user interface. The memory may include any type of RAM or ROM embodied in a physical storage medium, such as magnetic storage including floppy disk, hard disk, or magnetic tape; semiconductor storage such as solid state disk (SSD) or flash memory; optical disc storage; or magneto-optical disc storage. The CPU may include one or more processors for processing data according to instructions stored in the memory. The functions of the processor may be provided by a single dedicated processor or by a plurality of processors. Moreover, the processor may include, without limitation, digital signal processor (DSP) hardware, or any other hardware capable of executing software. The user interface may include any type or combination of input/output devices, such as a display monitor, touchpad, touchscreen, microphone, camera, keyboard, and/or mouse.

Figure 3:
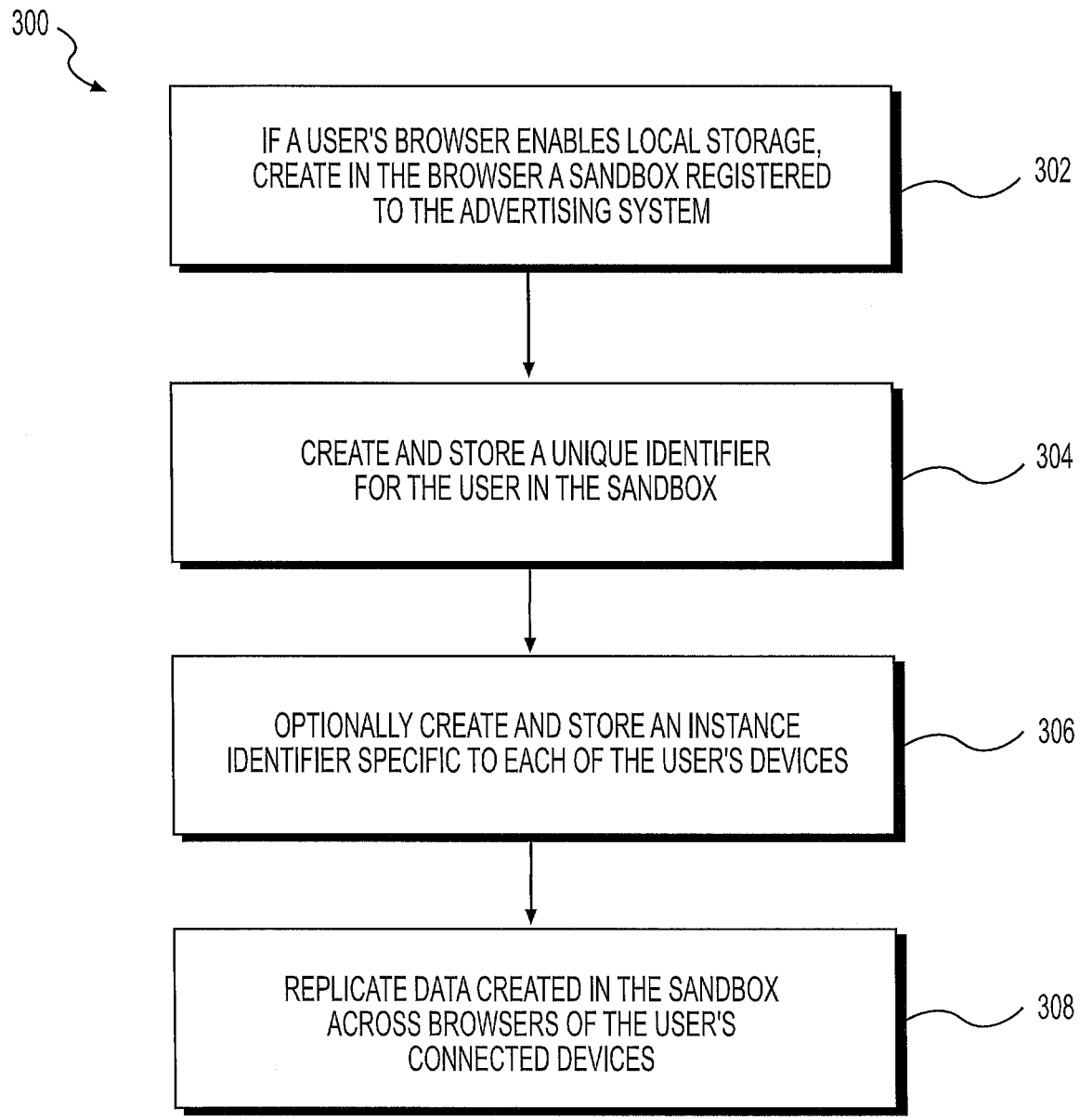
FIG. 3 is a flow diagram of a method for synchronizing user advertising IDs across devices and browsers, according to an exemplary embodiment of the present disclosure.
Figure 4:
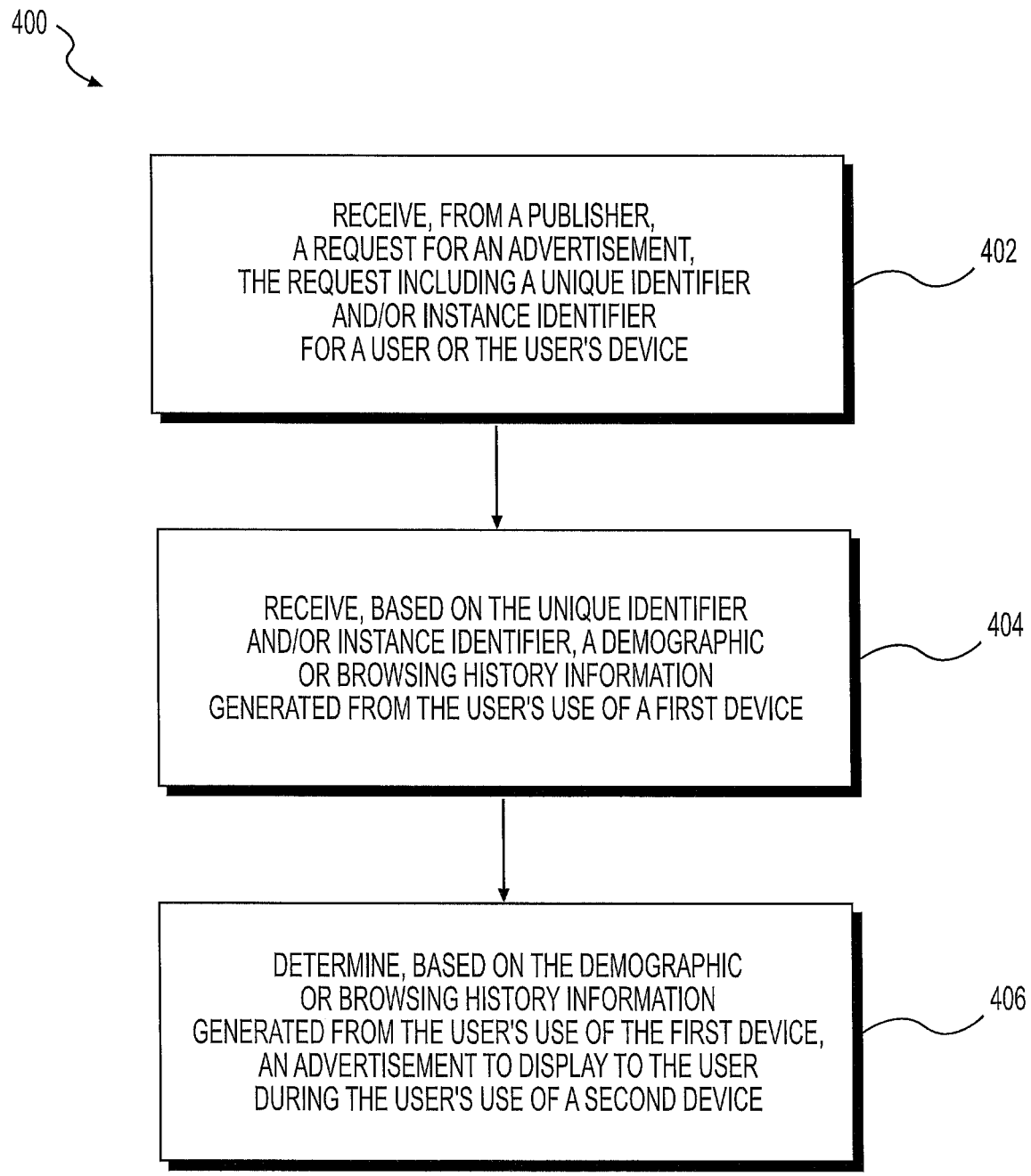
FIG. 4 is a flow diagram of a method for performing Internet advertising techniques based on user advertising IDs synchronized across devices and browsers, according to an exemplary embodiment of the present disclosure.
Figure 5:
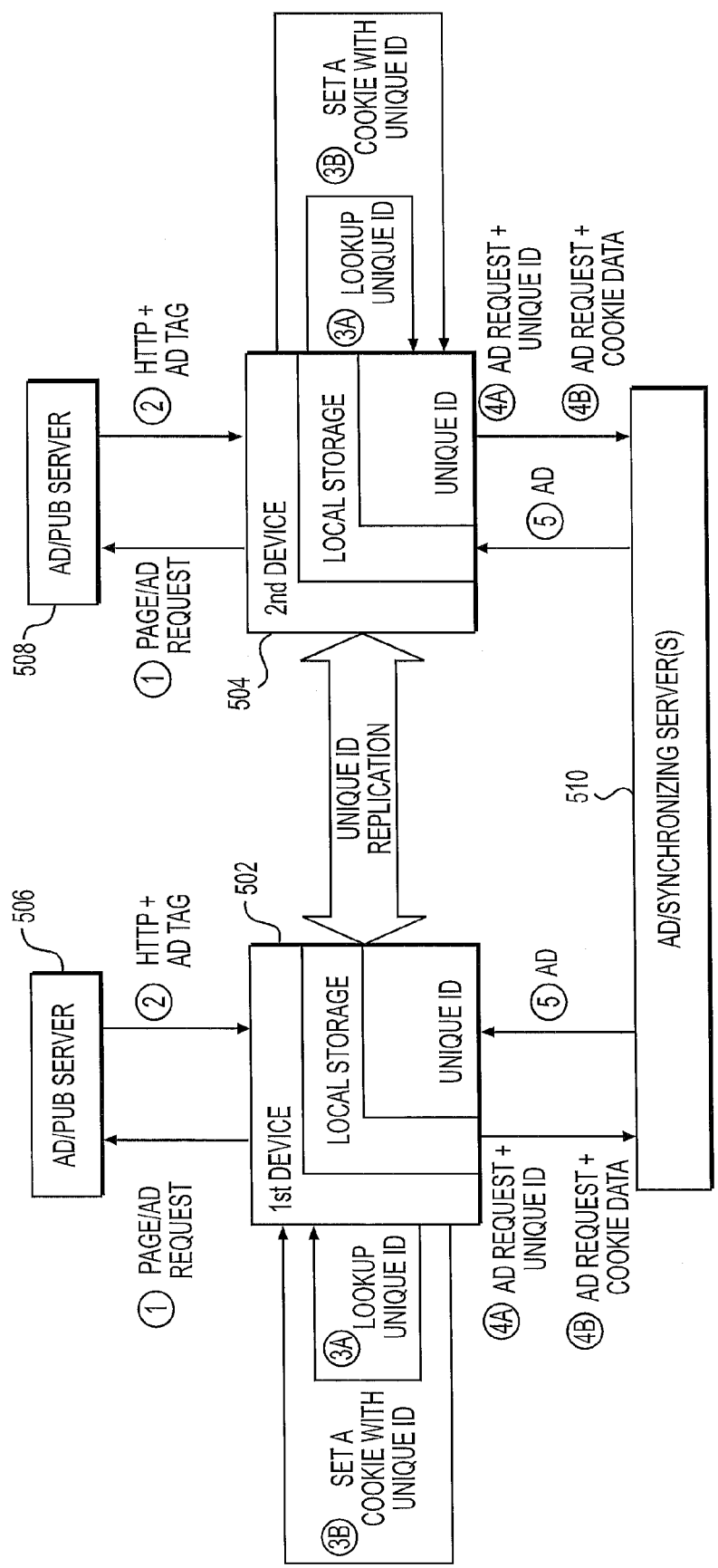
FIG. 5 is a schematic diagram of a flow for performing Internet advertising techniques based on user advertising IDs synchronized across devices and browsers, according to an exemplary embodiment of the present disclosure.

Regardless of specific physical components or layout, one or more of ad servers 152 and synchronizing processor 154, or any other servers or systems associated with ad network involving ad servers 152 and synchronizing processor 154, may be programmed with instructions to perform a method of synchronizing user advertising IDs across devices and browsers, and performing online targeted and behavioral advertising across user devices, according to the exemplary disclosed methods, such as the exemplary methods described with respect to FIGS. 3-5 below.

FIG. 3 is a schematic diagram of the flow of information between entities for synchronizing user advertising IDs across devices and browsers, and performing online targeted and behavioral advertising across user devices, according to an exemplary embodiment of the present disclosure. Specifically, according to embodiments of the present disclosure, user devices 102-110, publisher servers 112, advertiser servers 114, and ad servers 152, may exchange data with one or more of synchronizing processor 154 and databases 156 of synchronization server systems 150 (all through one or more computers and/or servers connected to the Internet 101, as described with respect to FIG. 2).

Specifically, FIG. 3 depicts a method 300 for synchronizing user advertising IDs across devices and browsers. In one embodiment, method 300 may include determining whether a user's browser enables local storage. If so, method 300 may include creating in the user's browser a sandbox stored in the local storage system and registered to the advertising system (e.g., a network associated with ad servers 152 and/or synchronizing server system 150) (step 302).

Method 300 may also include creating and storing a unique identifier for the user in the created sandbox (step 304). For example, method 300 may include generating a unique ID that will be used to reference the user associated with the device in which the sandbox was created, as well as other devices that the user uses to access the Internet. In one embodiment, a unique ID may be any type of numeric or alpha-numeric identifier that can uniquely identify one user from another. In one embodiment, the unique ID may be stored in database 156 and indexed or otherwise related to a profile of information known about the user matching the unique ID.

Method 300 may also include optionally creating and storing an instance identifier specific to each of the user's devices (step 306). For example, if it is desirable to know—not only that a user is visiting certain sites or taking certain actions using multiple devices—but also, which device the user was using during those site visits or, in one embodiment, an instance identifier may be associated with each device, and web browsing history and actions may be stored in relation to the instance identifier. In another embodiment, database 156 may store a table or index containing a unique identifier for each user, and a plurality of instance identifiers indexed or related to the unique identifier, each instance identifier being indexed or related to a device of the user.

Method 300 may also include replicating data created in the sandbox across multiple browsers and local drives of the user's connected devices (step 308). For example, in some embodiments, where a user is using a browser that enables users to log-in or otherwise authenticate, and enables synchronizing local storage data remotely (i.e., "in the cloud"), that remotely stored data may be synchronized or replicated across all devices in which a user has logged-in or authenticated into such a browser.

FIG. 4 is a flow diagram of a method for performing Internet advertising techniques based on user advertising IDs being synchronized across devices and browsers, according to an exemplary embodiment of the present disclosure. Specifically, FIG. 4 depicts a method 400 for executing techniques between ad servers 152, synchronizing processor 154, and/or databases 156 of synchronizing server systems 150 to advertise to users based on data collected across a plurality of devices they may use.

In one embodiment, method 400 may include receiving, from a publisher, a request for an advertisement, the request including a unique identifier and/or instance identifier for a user or the user's device (step 402). While an ad request may be received from a publisher, an ad request may alternatively or additionally be received from the user or from the user's device. Specifically, an ad server 152 may receive a request to deliver an ad or ad tag to a user upon the user requesting and/or visiting a web page hosted on a publisher server 112. In one embodiment, the ad request may include the unique ID assigned to the user, the instance ID assigned to the user's device, and/or cookie data containing one or both of the unique ID and the instance ID. As described above with respect to FIG. 3, the unique ID and/or instance ID may have been replicated through remote storage (e.g., cloud computing), across local storage of a plurality of the user's devices.

Method 400 may further include receiving, based on the unique identifier and/or instance identifier, a demographic or browsing history information generated from the user's use of a first device (step 404). Upon receiving the unique identifier and/or instance identifier, an ad server 152 and/or synchronizing processor 154 of the synchronizing server 150 may lookup demographic and/or browsing history information generated from the user's use of a first device. For example, the ad server 152 and/or synchronizing processor 154 may search databases 156 for the unique identifier and/or instance identifier to find indexed browsing history, demographic data, behavioral information, user profiling information, purchase history, etc. The stored historical data may be data generated from the user's first device or any other device having local storage containing the unique identifier and/or instance identifier.

Method 400 may further include determining, based on the demographic or browsing history information generated from the user's use of the first device, an advertisement to display to the user during the user's use of a second device (step 406). Specifically, when a user uses a second device to request web content, e.g., from a publisher server 112, the user's second device may also request an ad from an ad server 152. Because the user's second device may send an ad request containing the user's unique identifier or instance identifier, the ad servers 152 and/or synchronizing processor 154 may again lookup demographic or browsing history information generated from the user's use of a first device. For example, the ad server 152 and/or synchronizing processor 154 may search databases 156 for the unique identifier and/or instance identifier to find indexed browsing history, demographic data, behavioral information, user profiling information, purchase history, etc. The stored historical data may be data generated from the user's first device or any other device having local storage containing the unique identifier and/or instance identifier. As a result, the ad servers 152 and/or synchronizing processor 154 may be able to serve ads on the user's device based on one or more of: browsing history, demographic data, behavioral information, user profiling information, purchase history, any or all of which may be based on data collected from more than one device used by the user.

In general, publishers 112 may host websites having web pages that display content and advertising. In general, when a user uses a device 102-110 to visit a web page hosted on a publisher server 112, the publisher may send an impression request to an ad network, in this case, an ad server 152. In the impression request, the publisher 112 may request an advertisement to display to the visiting user. The impression request may include any data elements normally included in an impression request, such as information about the web page, the publisher, and/or the visiting user. The advertising system may select an advertisement for the publisher to display based on an algorithm that considers the received information about the web page, the publisher, and/or the visiting user. Thus, the Internet advertising system may, consistent with its ad bidding and exchange techniques and various business rules, award impressions of ads to impression requests from publisher servers 112. In other words, the Internet advertising system, through ad servers 152, may cause ads received from advertiser servers 114 to be displayed on web pages hosted on publisher servers 112 when users devices 102-110 request those web pages. Of course, as discussed above, the display of the ads may be precisely targeted both to the identities of the users and publishers of servers 112, and the content of the publisher's web page. For example, the Internet advertising system may select for display the ad that is most likely to generate a strong and favorable reaction from the visiting user, based on assumptions, historical data, and statistics gathered about the publisher's site and the user.

FIG. 5 is a schematic diagram of a flow for performing Internet advertising techniques based on user advertising IDs synchronized across devices and browsers, according to an exemplary embodiment of the present disclosure. Specifically, FIG. 5 depicts the flow of requests between a user's first device 502 and an ad or publisher server 506 and an ad or synchronizing server 510. FIG. 5 also depicts the flow of requests between a user's second device 504 and an ad or publisher server 508 and an ad or synchronizing server 510.

As described above, the user's first device 502 and second device 504 may be any type of device 102-110 described with respect to FIGS. 1 and 2. Also, it should be appreciated that any number of devices may be applicable within the scope of the description of FIG. 5. In addition, it should be appreciated that, although depicted as different, ad or publisher servers 506, 508 may optionally be the same server; and although depicted as a single server system, ad or synchronizing server(s) 510 may be separate and distinct servers accessed by the user's multiple devices, such as devices 502, 504. In one embodiment, the ad or publisher servers 506, 508 may correspond to publisher or advertiser servers 112, 114, and/or the ad or synchronizing server(s) 510 may correspond to the ad servers 152, synchronizing processor 154, and/or databases 156 of synchronizing server system 150.

As shown in FIG. 5, in one embodiment, the user's first device 502 may (1) request a web page or ad from an ad or publisher server 506; and (2) receive HTTP and an ad tag from the ad or publisher server 506. The user's first device 502 may execute the ad tag, such as by executing any type of client side script (e.g., JavaScript) to (3A) look-up a unique ID stored on the device. As described above, the unique ID may be stored within local storage associated with a browser of the device 502. The user's first device 502 may then (4A) issue an ad request to ad or synchronizing servers 510, where the request includes the looked-up unique ID. As an alternative to transmitting the unique ID in an ad request, the user device 502 may (3B) set a cookie containing the unique ID in location storage, and then (4B) issue an ad request to ad or synchronizing servers 510, where the ad request includes cookie data that may or may not include the unique ID. In one embodiment, the set cookie may include another type of advertising identifier that is cross-referenced to the user through the unique ID.

The ad or synchronizing servers 510 may then store any data relating to the user of the user device 502 in relation to a cookie ID or unique ID, such as browsing history, demographic data, behavioral information, user profiling information, purchase history, etc. As described above, because the unique ID may be replicated across local storage of several devices associated with the user, the ad or synchronizing servers 510 may target ads based on a more complete picture of a user's demographic or behavioral history. For example, the unique ID stored in local storage of the user's first device 502 may be replicated into local storage of the user's second device 504.

Accordingly, when the same user uses the second device 504 to access web pages using the same unique ID, the ad or synchronizing servers 510 may access information and data collected with respect to the user's use of the first device when determining which content and advertising to server to the user. Specifically, the user's second device 504 may (1) request a web page or ad from an ad or publisher server 508; and (2) receive HTTP and an ad tag from the ad or publisher server 508. The user's second device 504 may execute the ad tag, such as by executing any type of client side script (e.g., JavaScript) to (3A) look-up a unique ID stored on the device. As described above, the unique ID may be stored within local storage associated with a browser of the second device 504. The user's second device 504 may then (4A) issue an ad request to ad or synchronizing servers 510, where the request includes the looked-up unique ID. As an alternative to transmitting the unique ID in an ad request, the user device 504 may (3B) set a cookie containing the unique ID in location storage, and then (4B) issue an ad request to ad or synchronizing servers 510, where the ad request includes cookie data that may or may not include the unique ID. In one embodiment, the set cookie may include another type of advertising identifier that is cross-referenced to the user through the unique ID. Because the unique ID may be replicated across local storage of several devices associated with the user, the ad or synchronizing servers 510 may target ads based on a more complete picture of a user's demographic or behavioral history.

For example, the ad or synchronizing server(s) 510 may determine, based on the demographic or browsing history information generated from the user's use of the first device, an advertisement to display to the user during the user's use of a second device. Specifically, when a user uses a second device to request web content, e.g., from a publisher server 112, the user's second device may also request an ad from an ad server 152. Because the user's second device may send an ad request containing the user's unique identifier or instance identifier, the ad servers 152 and/or synchronizing processor 154 may again lookup demographic or browsing history information generated from the user's use of a first device.

For example, the ad server 152 and/or synchronizing processor 154 may search databases 156 for the unique identifier and/or instance identifier to find indexed browsing history, demographic data, behavioral information, user profiling information, purchase history, etc. The stored historical data may be data generated from the user's first device or any other device having local storage containing the unique identifier and/or instance identifier. As a result, the ad servers 152 and/or synchronizing processor 154 may be able to serve ads on the user's device based on one or more of: browsing history, demographic data, behavioral information, user profiling information, purchase history, any or all of which may be based on data collected from more than one device used by the user.

According to certain embodiments, the advertising systems may then advertise to a user based on which device a user is using to access the Internet. For example, if it is determined that a user is using his or her work computer, the advertising may incorporate all of the browsing and demographic data across the user's devices to determine an ad the user will most likely click on while using his or her work computer. If it is determined that a user is using his or her home computer, the advertising may incorporate all of the browsing and demographic data across the user's devices to determine an ad the user will most likely click on while using his or her home computer. If it is determined that a user is using his or her mobile device to access the Internet, the advertising may incorporate all of the browsing and demographic data across the user's devices to determine an ad the user will most likely click on while using his or her mobile device. Thus, the advertising system may be freed from previous constraints of considering only a user's work browsing history when delivering ads to the user's work computer browser, or considering only a user's home browsing history when delivering ads to the user's home computer, or considering only a user's mobile browsing history when delivering ads to the user's mobile device. To the contrary, the advertising system may advantageously use the presently disclosed unique identifier and related systems and methods to leverage a user's demographic and browsing history across all of the user's devices to identify and deliver targeted ads.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for identifying online advertisements to display to a user based on user data collected from use of a plurality of Internet devices of the user, the method including:
   receiving first user data, including at least one of a demographic and a browsing history information, generated from use of a browser of a first device of the plurality of Internet devices;
   storing the first user data in a database in relation to a unique identifier that is stored in and received from a local storage of the browser of the first device;
   receiving second user data, including at least one of a demographic and a browsing history information, generated from use of a browser of a second device of the plurality of Internet devices;
   storing the second user data in the database in relation to the unique identifier that is stored in a local storage of the browser of the second device;
   receiving, over a network at one or more servers, a request for an advertisement to display at the browser of the first device of the plurality of Internet devices, the request including the unique identifier stored in the local storage of the browser of the first device;
   accessing, in the database by the one or more servers, based on the request including the unique identifier, the second user data generated from use of the second device; and
   identifying, by the one or more servers, an advertisement to display at the first device, based at least in part on the accessed second user data generated from use of the second device.

2. The method of claim 1, further comprising:
   receiving, from the first device over a network, a request for web page content;
   determining, by the one or more servers, whether the request for web page content includes a unique identifier stored in the local storage of the browser of the first device; and
   transmitting, from the one or more servers to the first device, instructions to store a new unique identifier in the local storage of the browser of the first device upon determining that the request for web page content does not include the unique identifier.

3. The method of claim 1, further comprising:
   enabling the user to at least one of authenticate and log-in to the browser of the first device and the browser of the second device.

4. The method of claim 1, wherein the unique identifier is replicated in the local storage of the browser of the first device and in the local storage of the browser of the second device based on at least one of a remote computing platform and a cloud computing platform.

5. The method of claim 3, wherein the unique identifier is transmitted to the browser of the first device upon the user at least one of authenticating and logging-in to the browser of the first device.

6. The method of claim 1, wherein the local storage of the browser of the first device is at least one of a sandbox associated with the browser of the first device and a browser storage area of the browser of the first device.

7. The method of claim 1, further comprising:
   transmitting, from the one or more servers to the first device, instructions to store an instance unique identifier in the local storage of the browser of the first device, the instance identifier identifiers the browser of the first device; and
   storing, in the database in relation to the unique identifier, the instance identifier of the browser of the first device.

8. The method of claim 1, further comprising:
   sending instructions to the first device to set a cookie containing the unique identifier, and
   sending instructions to generate an ad request containing cookie data of the cookie.

9. The method of claim 1, wherein the first device and second device are at least one of a mobile device, a work computer, a home computer, a tablet computer, and an automobile computer of the user.

10. The method of claim 1, wherein each of the first user data and the second user data includes one or more of: browsing history, demographic data, behavioral information, user profiling information, and purchase history of the first device and the second device, respectively.

11. A system for identifying online advertisements to display to a user based on user data collected from a plurality of Internet devices of the user, the system including:

a data storage device storing instructions for identifying online advertisements to display to the user based on user data collected from the plurality of Internet devices of the user; and a processor configured to execute the instructions to perform a method including:

receiving first user data, including at least one of a demographic and a browsing history information, generated from use of a browser of a first device of the plurality of Internet devices;

storing the first user data in a database in relation to a unique identifier that is stored in and received from a local storage of the browser of the first device;

receiving second user data, including at least one of a demographic and a browsing history information, generated from use of a browser of a second device of the plurality of Internet devices;

storing the second user data in the database in relation to the unique identifier that is stored in a local storage of the browser of the second device;

receiving, over a network at one or more servers, a request for an advertisement to display at the browser of the first device of the plurality of Internet devices, the request including the unique identifier stored in the local storage of the browser of the first device;

accessing, in the database by the one or more servers, based on the request including the unique identifier, the second user data generated from use of the second device; and identifying, by the one or more servers, an advertisement to display at the first device, based at least in part on the accessed second user data generated from use of the second device.

12. The system of claim 11, wherein the processor is further configured for:

receiving, from the first device over a network, a request for web page content;

determining, by the one or more servers, whether the request for web page content includes a unique identifier stored in the local storage of the browser of the first device; and transmitting, from the one or more servers to the first device, instructions to store a new unique identifier in the local storage of the browser of the first device upon determining that the request for web page content does not include the unique identifier.

13. The system of claim 11, wherein the processor is further configured for:

enabling the user to at least one of authenticate and log-in to the browser of the first device and the browser of the second device.

14. The system of claim 11, wherein the unique identifier is replicated in the local storage of the browser of the first device and in the local storage of the browser of the second device based on at least one of a remote computing platform and a cloud computing platform.

15. The system of claim 13, wherein the unique identifier is transmitted to the browser of the first device upon the user at least one of authenticating and logging-in to the browser of the first device.

16. The system of claim 11, wherein the local storage of the browser of the first device is at least one of a sandbox associated with the browser of the first device and a browser storage area of the browser of the first device.

17. The system of claim 11, wherein the processor is further configured for:

transmitting, from the one or more servers to the first device, instructions to store an instance unique identifier in the local storage of the browser of the first device, the instance identifier identifiers the browser of the first device; and storing, in the database in relation to the unique identifier, the instance identifier of the browser of the first device.

18. The system of claim 11, wherein the processor is further configured for:

sending instructions to the first device to set a cookie containing the unique identifier, and sending instructions to generate an ad request containing cookie data of the cookie.

19. The system of claim 11, wherein the first device and second device are at least one of a mobile device, a work computer, a home computer, a tablet computer, and an automobile computer of the user.

20. A non-transitory computer-readable medium storing instructions that, when executed by a processor, cause the processor to perform a method for identifying online advertisements to display to a user based on user data collected from a plurality of Internet devices, the method including:

receiving first user data, including at least one of a demographic and a browsing history information, generated from use of a browser of a first device of the plurality of Internet devices;

storing the first user data in a database in relation to a unique identifier that is stored in and received from a local storage of the browser of the first device;

receiving second user data, including at least one of a demographic and a browsing history information, generated from use of a browser of a second device of the plurality of Internet devices;

storing the second user data in the database in relation to the unique identifier that is stored in a local storage of the browser of the second device;

receiving, over a network at one or more servers, a request for an advertisement to display at the browser of the first device of the plurality of Internet devices, the request including the unique identifier stored in the local storage of the browser of the first device;

accessing, in the database by the one or more servers, based on the request including the unique identifier, the second user data generated from use of the second device; and identifying, by the one or more servers, an advertisement to display at the first device, based at least in part on the accessed second user data generated from use of the second device.

* * * * *